(12) United States Patent
Davis

(10) Patent No.: US 6,357,004 B1
(45) Date of Patent: *Mar. 12, 2002

(54) SYSTEM AND METHOD FOR ENSURING INTEGRITY THROUGHOUT POST-PROCESSING

(75) Inventor: Derek L. Davis, Phoenix, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/940,231

(22) Filed: Sep. 30, 1997

(51) Int. Cl.[7] ............................................ G06F 11/30
(52) U.S. Cl. ........................................ 713/100; 713/176
(58) Field of Search ................................. 713/100, 176

(56) References Cited

U.S. PATENT DOCUMENTS

| | | | |
|---|---|---|---|
| 5,005,200 A | * 4/1991 | Fischer et al. | 380/30 |
| 5,345,576 A | * 9/1994 | Lee et al. | 395/425 |
| 5,465,299 A | * 11/1995 | Matsumoto et al. | 380/23 |
| 5,473,692 A | 12/1995 | Davis | 380/25 |
| 5,539,828 A | 7/1996 | Davis | 380/50 |
| 5,568,552 A | 10/1996 | Davis | 380/4 |
| 5,611,057 A | * 3/1997 | Pecone et al. | 395/282 |
| 5,751,809 A | 5/1998 | Davis et al. | 380/23 |
| 5,757,919 A | 5/1998 | Herbert et al. | 380/25 |
| 5,784,291 A | * 7/1998 | Chen et al. | 364/491 |
| 5,796,840 A | 8/1998 | Davis | 380/50 |
| 5,799,086 A | 8/1998 | Sudia | 380/23 |
| 5,805,706 A | 9/1998 | Davis | 380/49 |
| 5,805,712 A | 9/1998 | Davis | 380/50 |
| 5,818,939 A | 10/1998 | Davis | 380/49 |
| 5,825,879 A | 10/1998 | Davis | 380/5 |
| 5,828,753 A | 10/1998 | Davis | 380/49 |
| 5,862,218 A | 1/1999 | Steinberg | |
| 5,907,619 A | * 5/1999 | Davis et al. | 380/23 |

* cited by examiner

Primary Examiner—Thomas R. Peeso
(74) Attorney, Agent, or Firm—Blakely, Sokoloff, Taylor & Zafman LLP

(57) ABSTRACT

The system and method to protect integrity of a data set during post-processing operations. In general, integrity is protected by operations performed by a manipulation agent including a processor connected to dedicated memory. The operations of the manipulation agent include at least providing a data set and recording characteristics of each post-processing operation into the data set. The data set includes data and a record. The record includes a number of entries (fields) to contain the various characteristics of a post-processing operation such as an incoming hash value of the data, an extended digital signature, and the like.

24 Claims, 11 Drawing Sheets

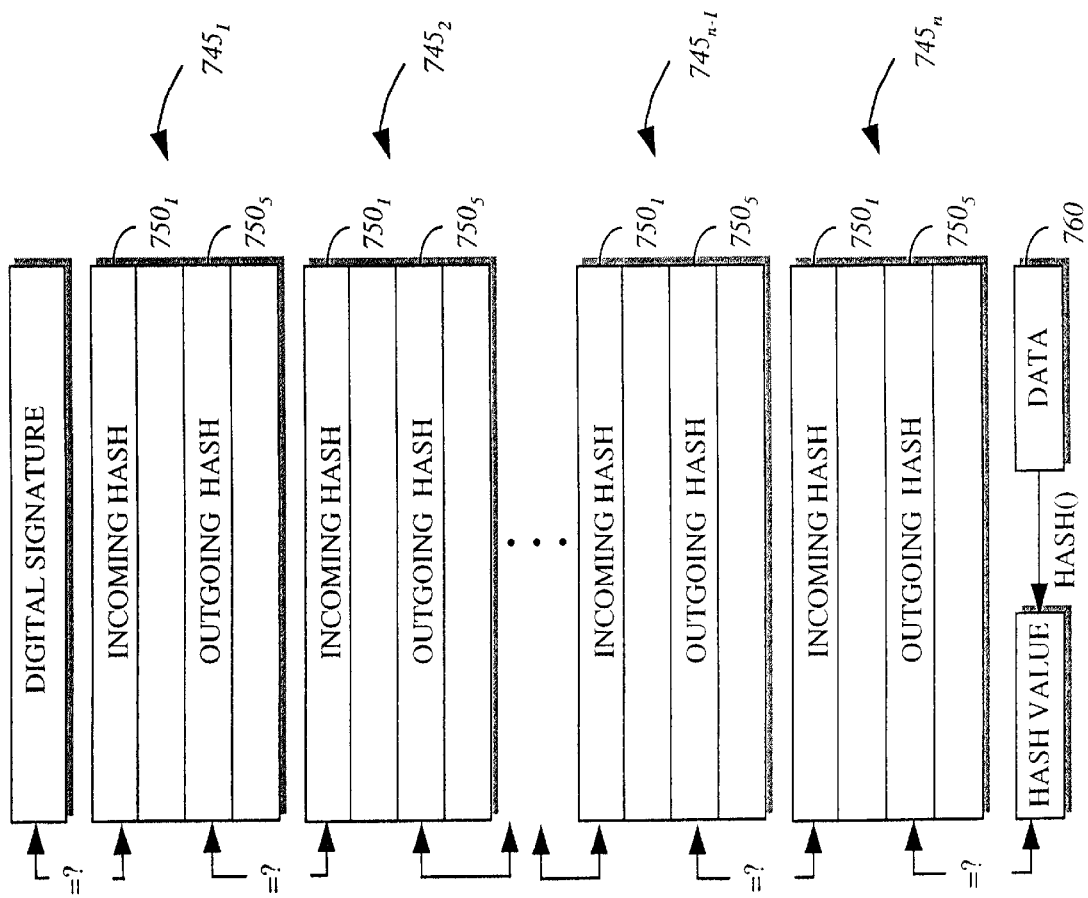

SYSTEM AND METHOD FOR ENSURING INTEGRITY THROUGHOUT POST-PROCESSING

BACKGROUND OF THE INVENTION

1. Field of the Invention

The present invention relates to the field of data security. More particularly, the present invention relates to a system and method of preserving integrity of a data set undergoing post-processing operations.

2. Description of Art Related to the Invention

Over the last few years, there have been many advances in hardware and software designed for implementation within an electronic capture device in order to digitize sensory data (e.g., a visible image and/or an audible sound). Examples of an "electronic capture device" include a digital camera, a digital video recorder, or a digital scanner. After being digitized, the sensory data may be immediately downloaded to a computer for storage on a hard disk drive. Alternatively, the data may be internally stored within the electronic capture device to be downloaded at a later time.

During storage or transmission, the digitized data is susceptible to illicit modification. Currently, digital signatures can be used to protect data integrity by ensuring that the digitized data cannot be illicitly modified without detection. Unfortunately, there is no scheme utilized by conventional electronic capture devices that supports modification of digitally-signed data without rendering its corresponding digital signature invalid.

SUMMARY OF THE INVENTION

The present invention relates to a system and method for preserving data integrity. First, a data set is provided. The data set includes data and a record. Thereafter, characteristics of post-processing operations associated with that data set are recorded into the record of the data set. In one embodiment, the contents of the records are used to verify whether the data has been compromised through unauthorized post-processing operations.

BRIEF DESCRIPTION OF THE DRAWINGS

The features and advantages of the present invention will become apparent from the following detailed description of the present invention in which:

FIG. 11 is a block diagram illustrating one feature of the validation scheme of FIG. 10 used to determine whether any illicit modifications were performed in post-processing by analyzing the data stream.

DESCRIPTION OF THE PREFERRED EMBODIMENT

Figure 1:
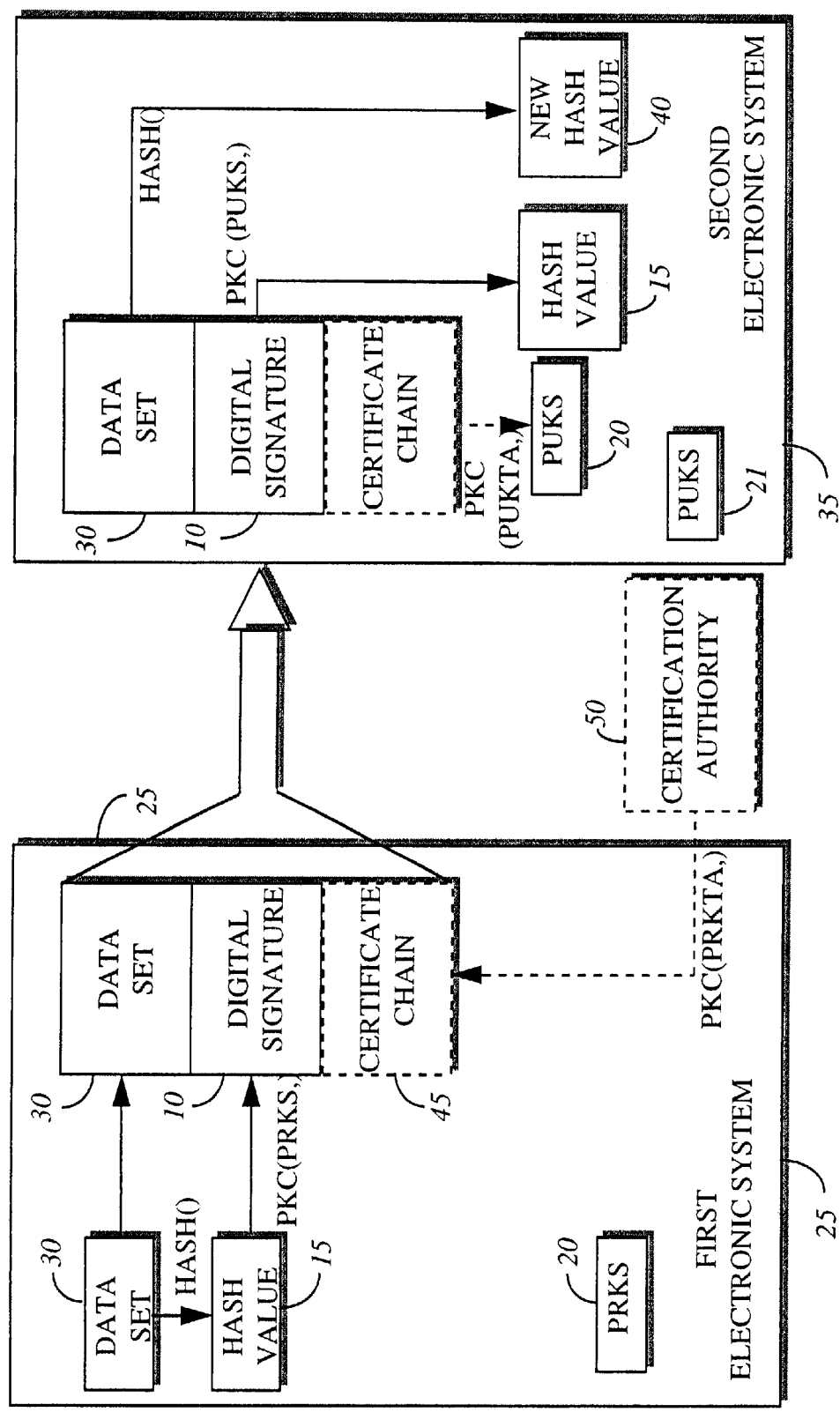
FIG. 1 is a block diagram illustrating the creation of a digital signature through cryptographic operations.

The present invention relates to a system and method designed to preserve the integrity of information undergoing post-processing operations. The system includes one or more electronic devices capable of performing operations that collectively protect data integrity during post-processing. The method is directed to these operations, regardless of the illustrative hardware implementation. This is due to the fact that the preservation of a data set during post-processing may be practiced by a number of hardware implementations besides those explicitly mentioned herein.

In the following description, some terminology is used to generally describe certain features or characteristics of the present invention. For example, an "electronic system" may include a computer (e.g., a portable, desktop, server, mainframe, etc.) or any other equipment having digital processing capability including an electronic capture device such as a digital camera, digital camcorder, digital scanner and the like. "Information" is generally defined as one or more bits of (i) data, (ii) address, and/or (iii) control. A "data set" is generally defined as digitized information including a record and data. The "data" includes, but is not limited or restricted to sensory data (e.g., a digitized visible image, digitized audible sound, etc.) and/or non-sensory data (e.g., a digital document). The "record" includes information used for verification (e.g., authentication or identification) of the data set and possibly its sender. An illustrative embodiment of the record is described below. "Integrity" is generally defined as a state where information has not been modified in an unauthorized manner.

Additional terminology includes a "key" which is an encoding and/or decoding parameter used by conventional cryptographic techniques such as a symmetric key cryptographic function (e.g., a Data Encryption Algorithm as specified in Data Encryption Standard) or a public-key cryptographic function (PKC) such as a Rivest, Shamir and Adleman (RSA) function. A "hash function" is an operation of converting incoming information of any arbitrary length into a hash value of a fixed size. Examples of hash functions may include, but are not limited or restricted to the following: Message Digest 5 (MD5) provided by RSA Data Security, Inc. of Redwood City, Calif. or Secure Hash Algorithm (SHA-1) specified by the National Institute of Standards and Technology of Washington, D.C.

It is contemplated that digital signatures may be used to protect the integrity of a data set by providing a reliable mechanism to check whether the data set has not been illicitly modified (referred to as "compromised") after being digitally signed. Herein, a "digital signature" is generally defined as a transformation, normally using a public-key cryptographic function by encrypting information with a private key of the signatory. For digital signatures, this information may include data content of the data set in its entirety, or a hash value of that data set after being transferred through a one-way hash function.

For example, as shown in FIG. 1, if digital signature 10 contains information (e.g., a hash value 15) encrypted with a private key (PRKS) 20 associated with a first electronic system (provider) 25, one can accurately determine whether the information has been compromised. This may be accomplished by a second electronic system (recipient) 35 translating original data set 30, concurrently provided with digital signature 10, into a new hash value 40 by a one-way hash function identical to the hash function used by first electronic system 25 to generate hash value 15. Next, the second electronic system 35 decrypts digital signature 10 with a pre-stored or loaded public key (PUKS) 21 of first electronic system 25 to recover hash value 15. After recovering hash value 15, a comparison is performed between new hash value 40 with recovered hash value 15. If there is a match, the original data set 30 has not been compromised.

For authentication, digital signature 10 may be accompanied by an optional (represented by dashed lines) digital certificate chain 45 including at least one digital certificate. The "digital certificate" is generally defined as any information pertaining to the provider, typically its public key 21, encrypted with a private key (PRKTA) by a certification authority 50. Normally, a "certification authority" 50 is any person or entity in a position of trust to guarantee or sponsor digital certificate chain, including but not limited or restricted to a bank, governmental entity, trade association, a manufacturer, and the like. The public key (PUKTA) of the certification authority 50 may be widely available and loaded or stored within second electronic system 35. The "digital certificate chain" 45 is a hierarchy of digital certificates upon which information from one certificate may be used to obtain information of another certificate.

Of course, once data set 30 has been digitally "signed", modification of data set 30, whether for illicit or legitimate reasons, will invalidate digital signature 10. As a result, this technique of using digital signatures to protect the integrity of information is quite limited. The reason is that digital signatures fail to account for any legitimate post-processing without an appearance that the information has been compromised. "Post-processing" involves the performance of operations on information after the information has been digitally signed. For example, certain compression/decompression techniques performed on original data set 30 (e.g., using "lossy compression") would inevitably result in a decompressed, resultant data set that does not exactly match the original data set. Thus, if applied to the data set before such compression, digital signature 10 would be invalidated. This precludes any certainty that the resultant data set has not been compromised.

To overcome this disadvantage, a system and method of the present invention is developed in order to allow general post-processing of digital data while still maintaining a chain of integrity. This system and method would be valuable to a number of industries such as Internet Service Providers, content distribution industry, the banking industry, insurance industry, real-estate industry, and the like.

Figure 2:
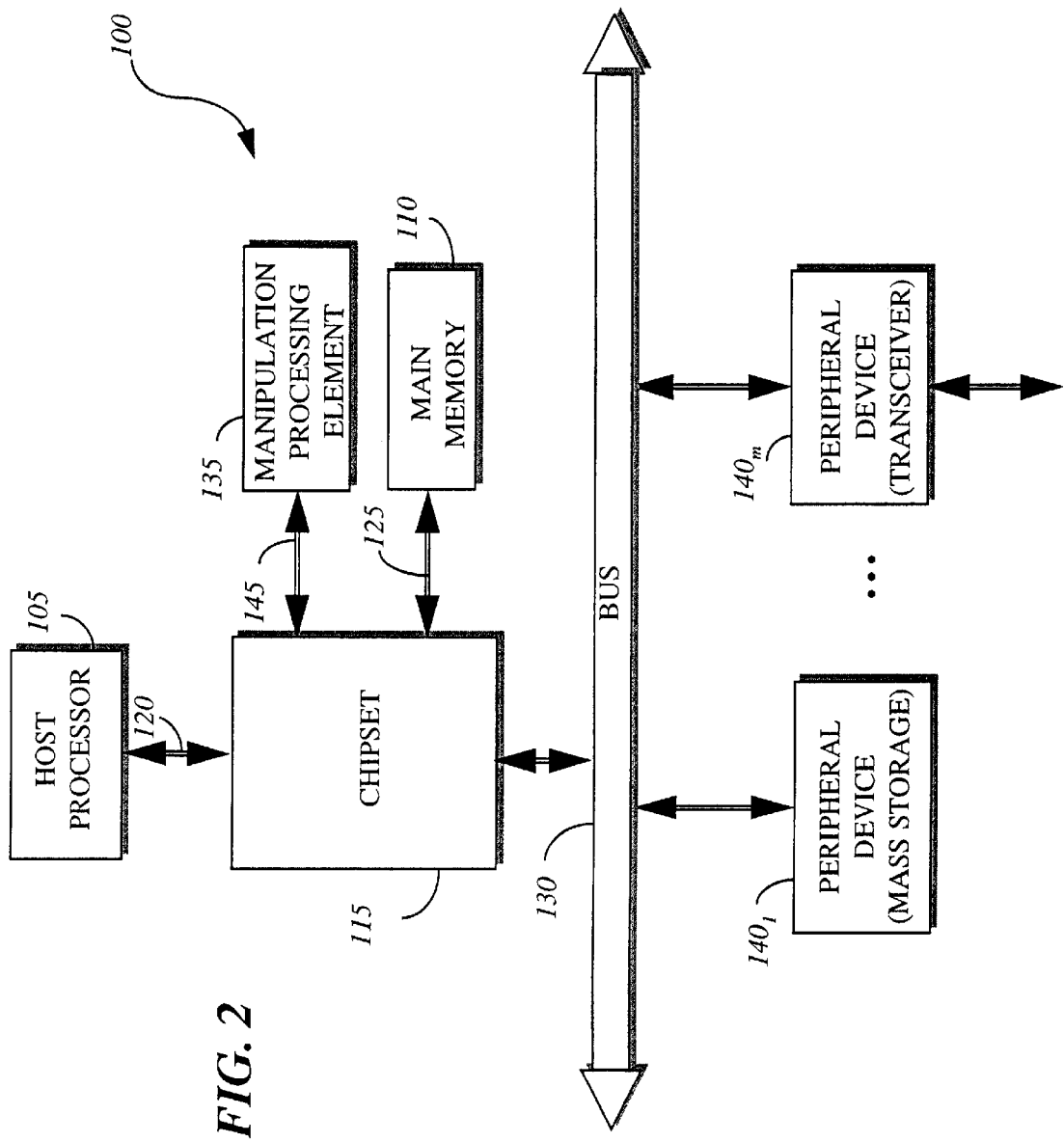
FIG. 2 is a block diagram illustrating a first embodiment of an electronic system that ensures data integrity throughout post-processing.

Referring now to FIG. 2, a first embodiment of an electronic system 100 employing the present invention is shown. In this embodiment, electronic system 100 comprises a host processor 105, a main memory element 110 (e.g., any non-volatile or volatile memory such as dynamic random access memory "DRAM" or static random access memory "SRAM") and a manipulation processing element 135 connected together by a chipset 115. The chipset 115 establishes communication paths between a plurality of buses, namely a host bus 120, a memory bus 125, a peripheral bus 130 and a dedicated bus 145. It is contemplated, however, that manipulation processing element 135 may be connected to the host bus 120 or peripheral bus 130 in lieu of bus 145.

The peripheral bus 130 provides a communication path between a plurality of peripheral devices $140_1$–$140_m$ ("m" being a positive whole number). The peripheral bus 130 may be a Peripheral Component Interconnect (PCI) bus, Industry Standard Architecture (ISA) bus or any other type of bus architecture. It is contemplated that peripheral bus 130 is shown as a single bus, but it may be multiple buses connected together through bridge circuitry in which each peripheral device $140_1$–$140_m$ is connected to at least one of the multiple buses. Additionally, peripheral devices $140_1$–$140_m$ may include, but are not limited or restricted to a mass storage device $140_1$ (e.g., a hard disk drive, a compact disc-read only memory "CD-ROM" player, CD recordable player, digital tape drive, a floppy disk drive, a digital video disk player, etc.), a transceiver device $140_m$ (e.g., a network interface circuit "NIC" card, a modem, etc.) and the like.

Figure 3A:
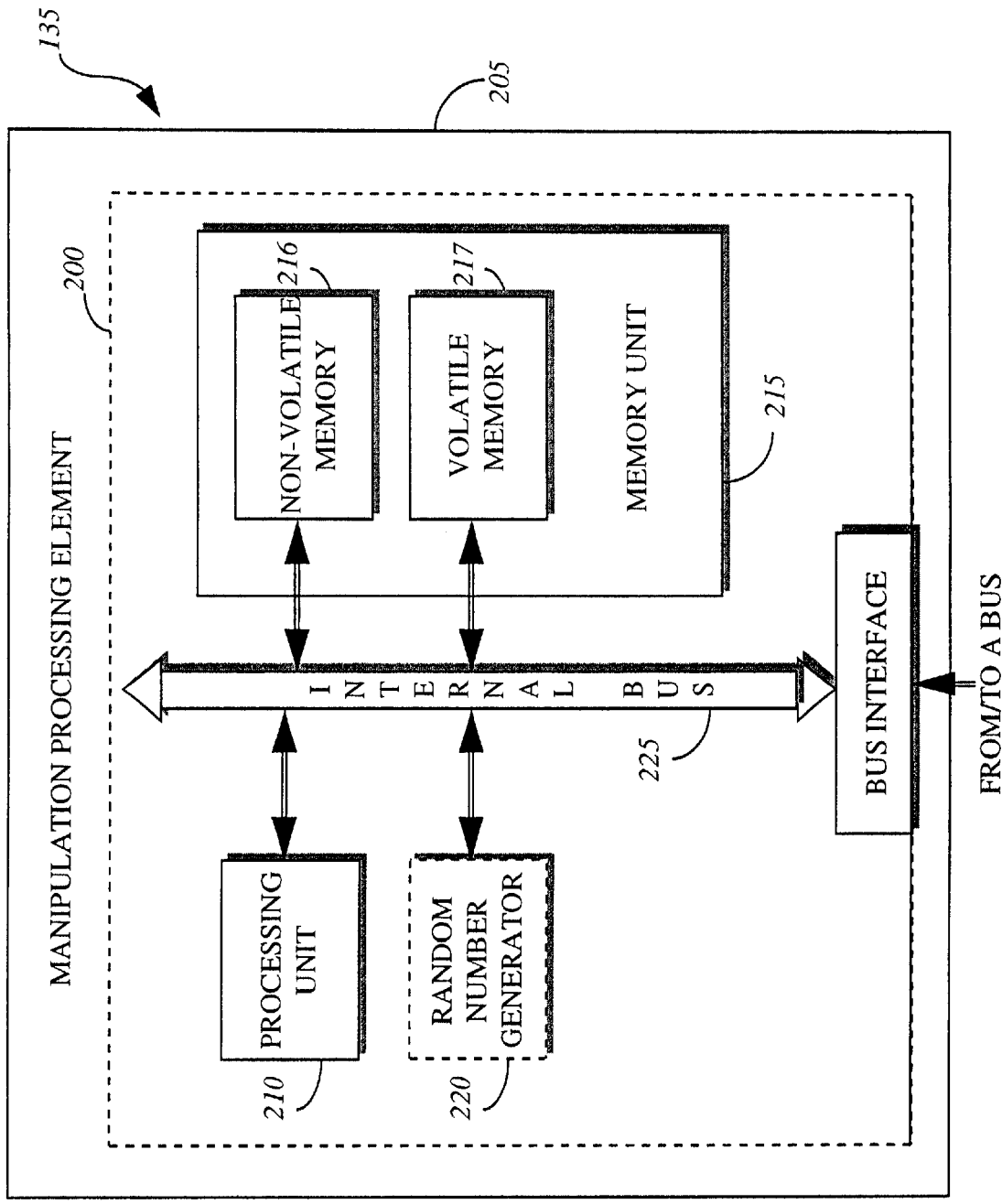
FIGS. 3A and 3B are block diagrams illustrating embodiments of a manipulation processing element implemented within the electronic system of FIG. 2.
Figure 3B:
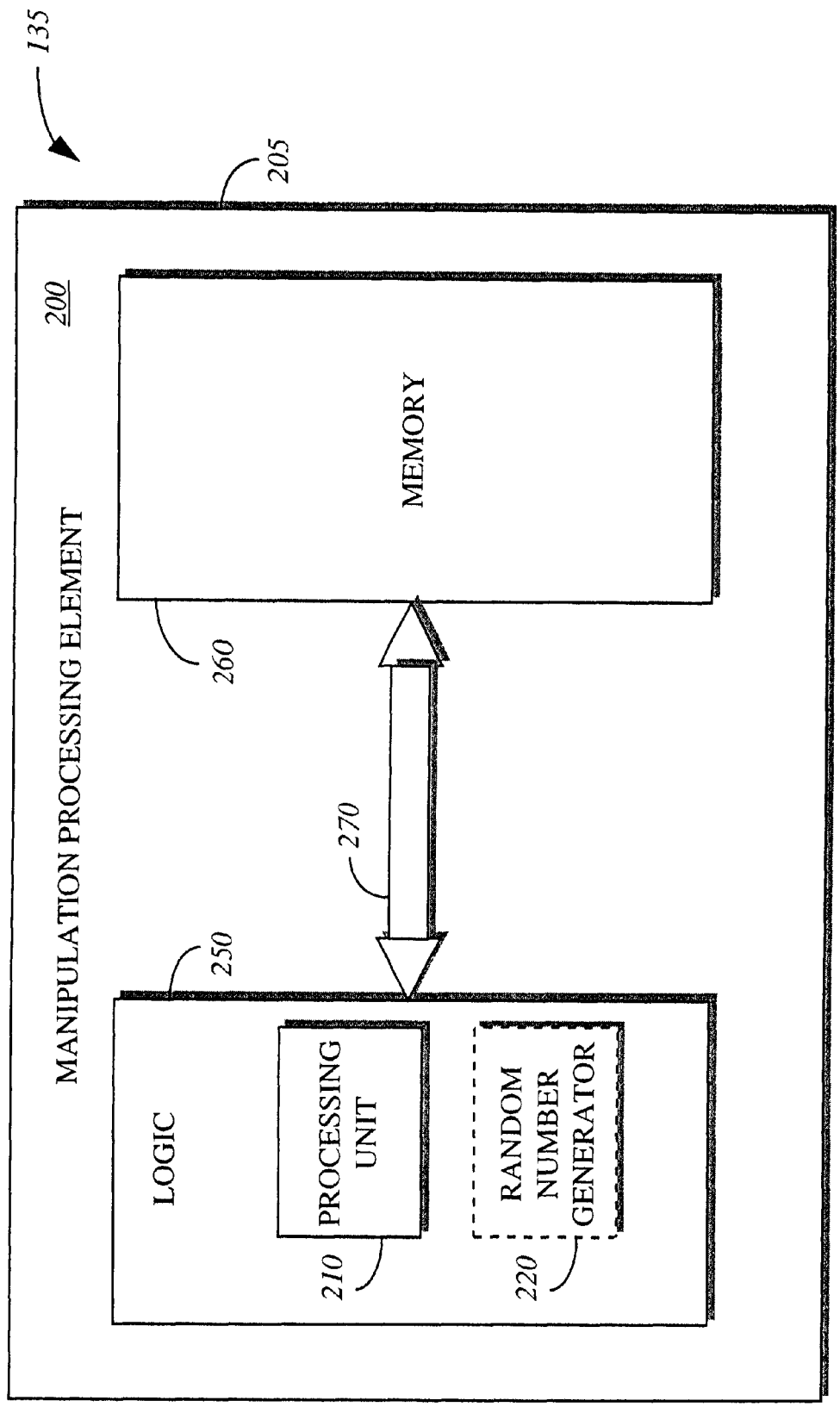

Referring to FIGS. 3A and 3B, illustrative embodiments of manipulation processing element 135 of FIG. 2 is shown. Connected to a bus when placed in an electronic system (e.g., bus 145), manipulation processing element 135 comprises an integrated circuit (IC) device 200 contained within a package 205. The package 205 protects IC device 200 from damage and harmful contaminants. It is contemplated that IC device 200 may include a single IC chip or multiple IC chips in communication with each other.

As shown in FIG. 3A, IC device 200 comprises a processing unit 210, a memory unit 215, and an optional random number generator 220, all of which may be interconnected through an internal bus 225. IC device 200 supports post-processing operations and cryptographic operations such as, for example, encryption and/or decryption, creation of a digital signature, performance of a hash function and generation of keys (e.g., by random number generator 220 if implemented).

In this embodiment, processing unit 210 performs computations on the data set internally within a secure environment (i.e., an environment with minimal vulnerability to a physical or algorithmic attack). These computations involve post-processing operations including, but not limited or restricted to cropping, feature enhancement, recolorization, compression and/or decompression, resolution reduction, frame deletion interpolative resolution enhancement, rotation as well as font changes, background color modification, scaling, ordering, spell-checking, repagination and the like.

Memory unit 215 may include a non-volatile memory element 216 which is capable of storing a device unique, public/private key pair to support public-key cryptography, at least one digital certificate, software to support post-processing operations and an optional identification number uniquely assigned to manipulation processing element 135. This non-volatile memory 216 is used primarily because it retains its contents when supply power is discontinued. In addition, memory unit 215 may include random access memory (RAM) 217 in order to temporarily contain certain results from processing unit 210.

As shown in FIG. 3B, IC device 200 comprises a logic unit 250 and a memory unit 260. Logic unit 250 includes logic circuitry such as processing unit 210 and optional random number generator 220 described above. Memory unit 260 includes at least non-volatile memory (e.g., flash memory) for internal storage within package 205. These units 250 and 260 are connected together by a bus 270 which enables information to be exchanged one or more bits at a time.

Referring back to FIG. 2, although manipulation processing element 135 is implemented as a co-processor, it is contemplated that a variety of different implementations could be selected. For example, manipulation processing element 135 may be implemented within a disk controller, on a Personal Computer Memory Card International Association (PCMCIA) or "smart" card, or within a cartridge-like package including host processor 105 as described in FIGS. 4–6. Other alternative implementations may include incorporating the functionality of manipulation processing element 135 into a chipset and/or within host processor 105 as shown for illustrative purposes as FIG. 7.

Furthermore, even though manipulation processing element 135 appears to be described in connection with a PC platform, it is contemplated that it could be implemented within any electronic system including peripherals such as a fax machine, printer, plotter and other peripherals or even on a communication path between a computer and an I/O peripheral device.

Figure 4:
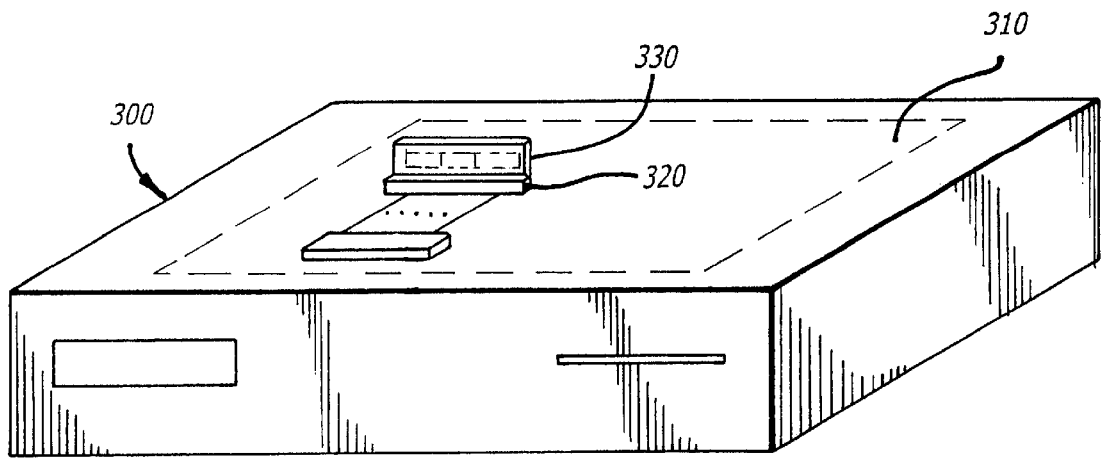
FIG. 4 is a perspective view of a second embodiment of the electronic system ensuring data integrity throughout post-processing.

Referring to FIG. 4, a second embodiment of an electronic system 300 implemented with the present invention is shown. The electronic system 300 (e.g., a computer) includes a system substrate 310, outlined by dashed lines, which controls the overall functionality of electronic system 300. Normally formed with any type of material or materials upon which integrated circuit components can be attached, system substrate 310 includes a connector 320 which enables communications between logic placed on system substrate 310 and a processing unit 330 connected to the connector 320. Any style for connector 320 may be used, including a standard female edge connector or a pin field connector.

Figure 5:
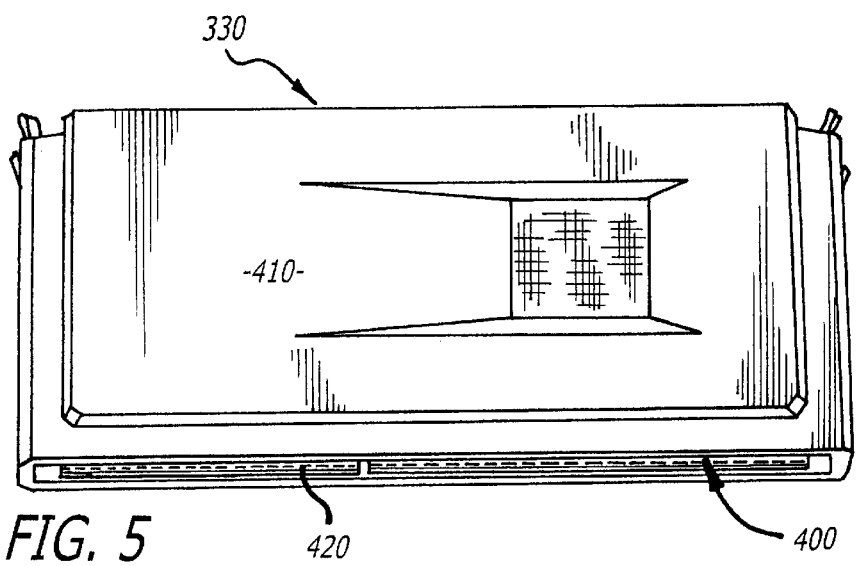
FIG. 5 is a perspective view of a processing unit of FIG. 4 including the manipulation processing element.

Referring now to FIG. 5, processing unit 330 includes a processor substrate 400 formed from any type of material upon which integrated circuitry (not shown) can be attached through well-known techniques (e.g., solder connection, etc.). The processor substrate 400 is substantially covered by a rectangular-shaped package 410 in order to protect its integrated circuitry from damage or harmful contaminants. The processor substrate 400 includes a connector 420, preferably adapted to establish a mechanical and electrical connection with connector 320 of FIG. 4. As shown, connector 420 includes any type of connector which mates with connector 320. In this embodiment, connector 420 includes a standard male edge connector.

Figure 6:
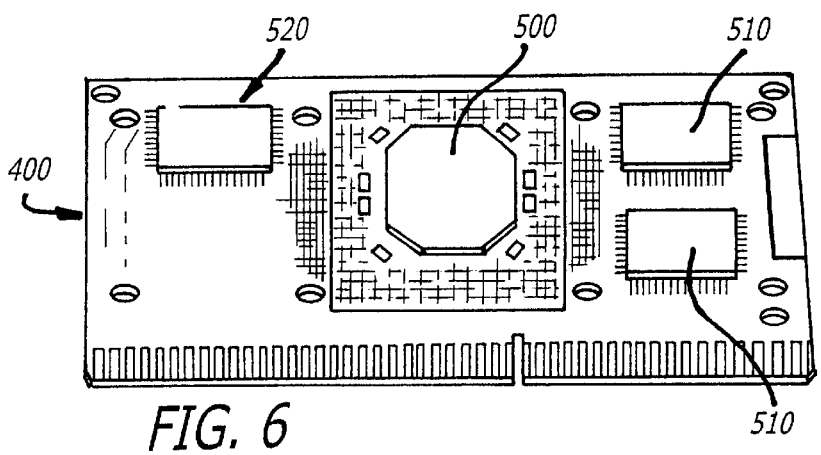
FIG. 6 is a perspective view of a top side of a processor substrate of the processing unit of FIG. 5.

Referring to FIG. 6, an illustrative embodiment of processor substrate 400 are shown. The integrated circuitry of processor substrate 400 include, but is not limited or restricted to at least one processor 500, memory 510 and a manipulation processing element 520. For communication with processor 500, manipulation processing element 520 may be connected to a backside bus (typically also connecting to memory element 510), to a front-side bus (typically also connecting to external connector 420 of FIG. 5), or on a dedicating internal bus. Of course, the placement of this logic (manipulation processing element) is arbitrary so long as the latency is acceptable and its intended operations are fully supported. Although not shown, discrete components (e.g., capacitors, oscillators, resistors, inductors, etc.) are attached to processor substrate 400 in a selected manner to, among other things, maximize routability and decrease length of communication lines between integrated circuitry.

As further shown in FIG. 6, the manipulation processing element 520 may be alternatively configured as a combination of logic which is placed on processor substrate 400 and collectively performs post-processing operations. The processor 500 is a single microprocessor but may include one or more microprocessors. The memory 510 may include, but is not limited or restricted to non-volatile memory such as read only memory (ROM), erasable programmable read only memory (EPROM), flash memory and the like.

Figure 7:
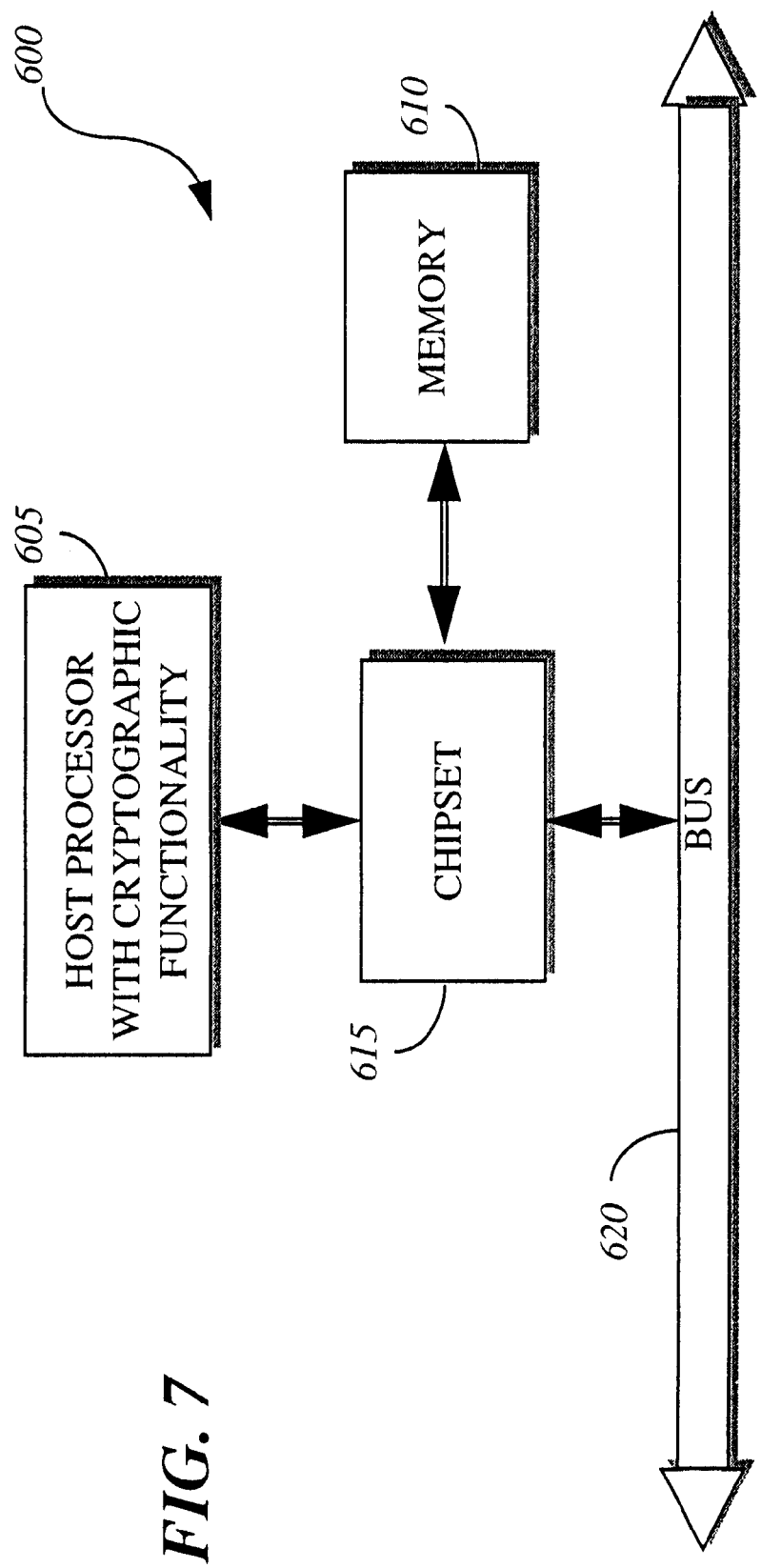
FIG. 7 is a block diagram illustrating a third embodiment of an electronic system that ensures data integrity throughout post-processing.

Referring now to FIG. 7, a third embodiment of an electronic system 600 employing the present invention is shown. Similar to the electronic system 100 of FIG. 2, this electronic system 600 comprises a host processor 605 and a main memory element 610 (e.g., DRAM, SRAM, etc.) connected together by a chipset 615. Chipset 615 is connected to a bus 620.

The host processor 605 includes the functionality of the manipulation processing element with an ability to perform post-processing operations on a data set. With respect to the host processor implementation, this may be accomplished by constructing host processor 605 as a multi-chip module operating in combination with the die (or dice) forming the manipulation processing element or as a single-chip host processor having the functionality in the form of protected execution capability.

It is contemplated that secure post-processing operations may be supported by either dedicated circuitry such as manipulation processing element (FIGS. 3A, 3B, 4, 5 and 6) or non-dedicated circuitry (e.g., chipset, peripheral device or host processor described in FIG. 7). Thus, for clarity sake, a "manipulation agent" is defined as any circuitry supporting post-processing operations including both dedicated and non-dedicated circuitry.

Figure 8A:
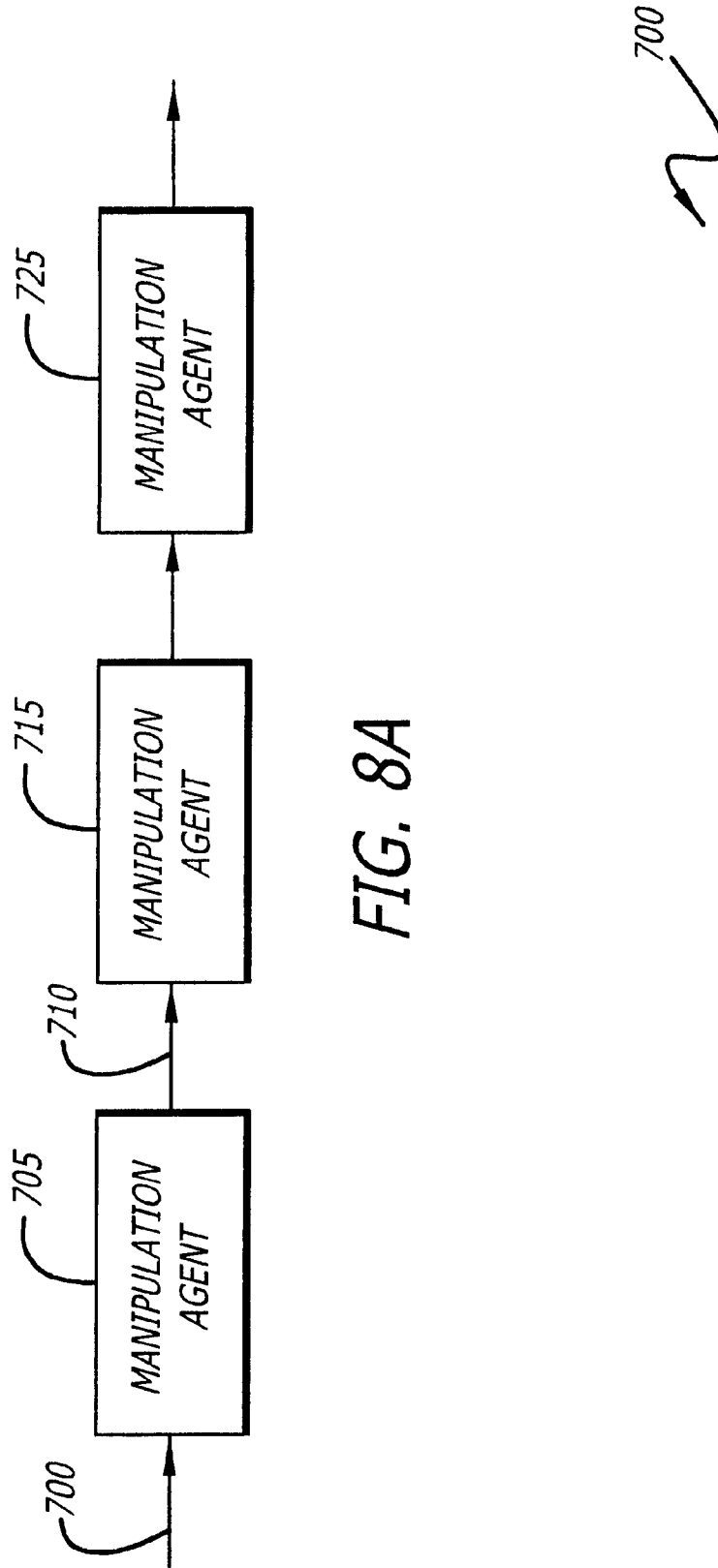
FIGS. 8A–8D are block diagrams illustrating the data set including data and a record.
Figure 8B:
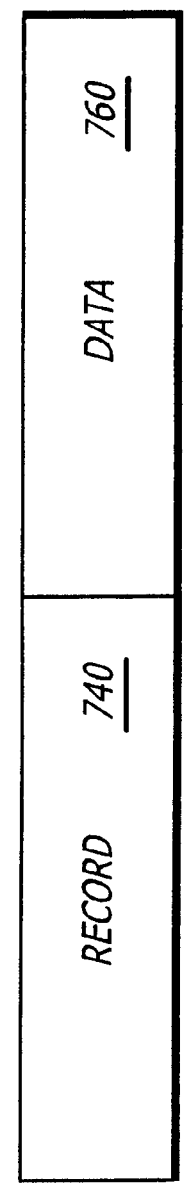

Referring to FIGS. 8A–8D, post-processing operations by one or more manipulation agents is shown. In FIG. 8A, an original data set 700 is provided to a first manipulation agent 705. As shown in FIG. 8B, the data set 700 includes a record 740 and data 760. In this embodiment, "data" 760 includes either sensory data or non-sensory data. The "record" 740 contains information that can be used to determine whether modifications to data set 700 were in accordance to a predetermined set of authorized operations or otherwise acceptable.

Figure 8C:
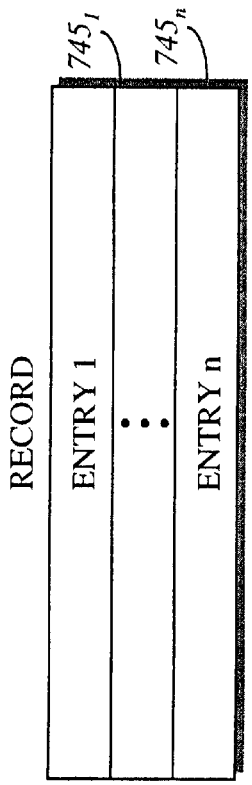

Referring back to FIG. 8A, after performing post-processing operations on data of an incoming data set (e.g., original data set 700), a new, modified data set 710 is created by first manipulation agent 705. The modified data set 710 features an updated (or augmented) record which includes information relating to the post-processing operations and a digital signature over the data set after these post-processing operations. As shown in FIG. 8C, record 740 may include a number of entries (fields) $745_1$–$745_n$ ("n" being a positive whole number; $n \geq 2$ in this embodiment). Each of the entries $745_1$–$745_n$ has been created by either the original provider of data set 700 or by a previous manipulation agent. Typically, the first entry $745_1$ will simply include the digital signature applied by the provider of the original data set 700. As the data set is modified by more manipulation agents 715 and 725 (see FIG. 8A), the entries for each of these updated data sets are added to the record 740.

Figure 8D:
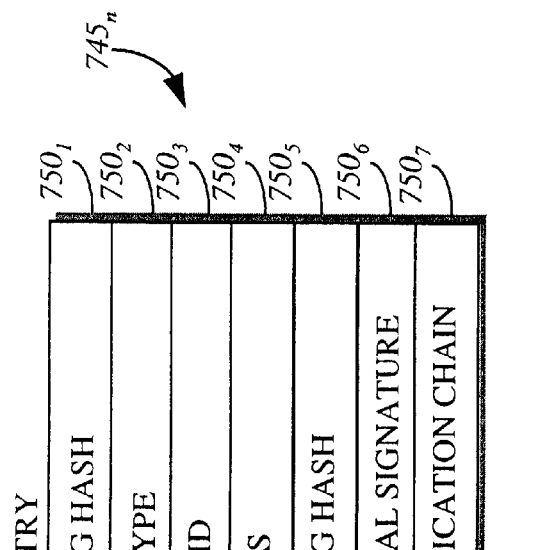

As shown in FIG. 8D, after post-processing activities are completed, a new entry (e.g., $n^{th}$ entry $745_n$) is created having data fields to contain characteristics associated with post-processing operation(s). The entry $745_n$, like all entries, would include (i) a hash value $750_1$ computed from the incoming data, (ii) an optional Manipulation Agent Type (MA_TYPE) $750_2$, (iii) an optional Manipulation Process Identifier (MP_ID) $750_3$, (iv) at least one Manipulation Operation Specifier (MOS) value $750_4$, (v) an optional outgoing hash value $750_5$ computed over the outgoing (post-processed) data, (vi) an extended digital signature $750_6$ applied to the preceding fields of the entry, and (vii) one or more optional certificates (certificate chain) $750_7$.

The incoming hash value $750_1$ is used to verify the data received by the manipulation agent has not been compromised. MA_TYPE $750_2$ establishes which manipulation agent performed post-processing operations on the data. Note that this information may also be obtained from the optional certificate(s) $750_7$ (if provided). Additionally, the MP_ID $750_3$ specifies which specific configuration (e.g. software) of the manipulation agent has been used to perform the post-processing operations.

MOS value(s) $750_4$ specifies what operation(s) was (were) performed on the data. For example, one MOS value might indicate "background color changed to blue", while another might indicate "font style changed to 8-point Times", while yet another might indicate "image scaled by 132%". The outgoing hash value $750_5$ provides sufficient information for verification of the post-processed data produced by the manipulation agent by performing a hash operation of the data. The extended digital signature $750_6$ is produced by hashing the data after post-processing operations were completed, referred to as an "outgoing hash value", and encrypting the outgoing hash value under the private key of the manipulation agent. The outgoing hash value may be used to provide sufficient information for verification of the post-processed data produced by the manipulation agent. The optional certificate or certificate chain $750_7$ may support the process used in authenticating the extended digital signature $750_6$.

Referring back to FIG. 8C, after the new entry (e.g., entry $745_n$) is created, it is appended to record 740, generally without modifying any of the previous entries $745_1$–$745_{n-1}$. This process continues for subsequent post-processing operations performed by different electronic systems in which the byte size of the record 740 is augmented. Local verification of data sets at each electronic system is not required, but may be used to alleviate potential bandwidth issues.

Figure 9:
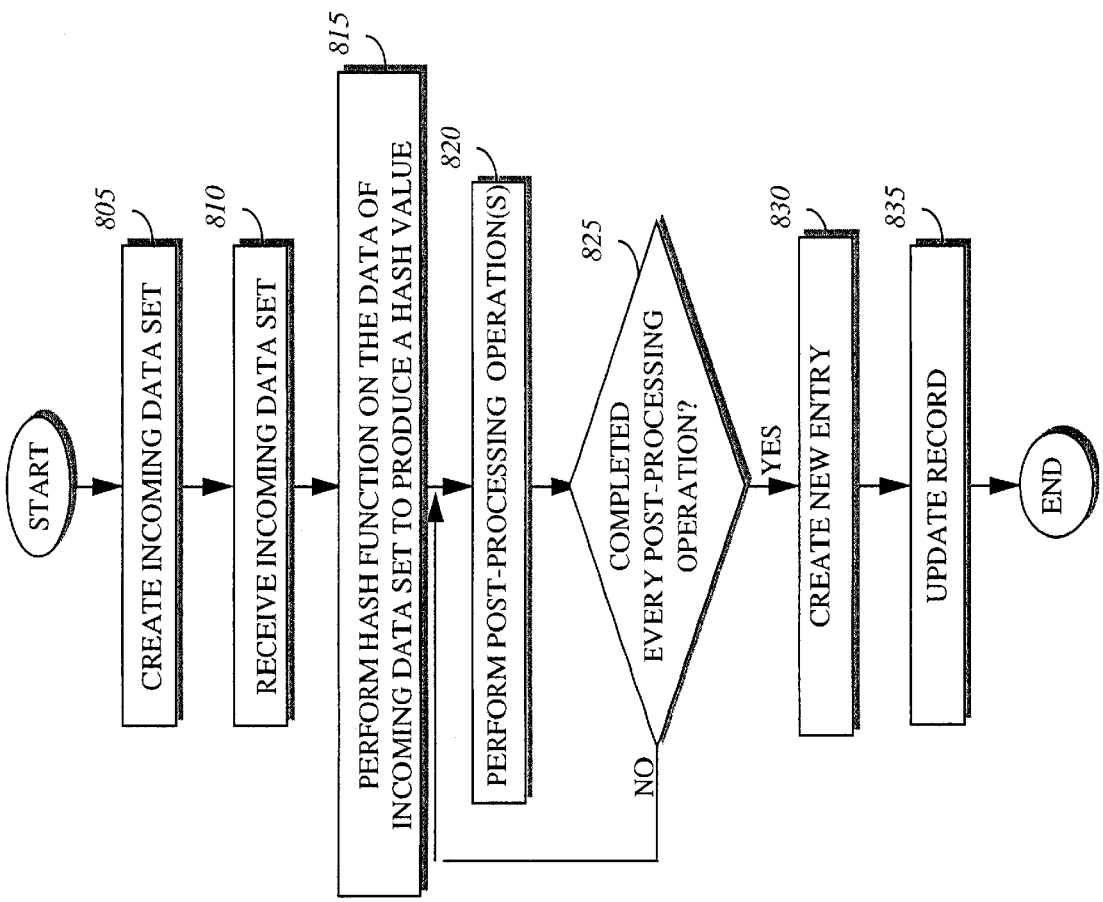
FIG. 9 is a flowchart illustrating those procedural steps undertaken in preserving integrity of generalized data.

Referring to FIG. 9, operations performed to support post-processing of information without sacrificing its integrity is shown. For example, an incoming data set is captured or created (Block 805). The creation or capture of the incoming data set may involve a number of sub-steps. For example, one sub-step is that the data of the incoming data set needs to be either captured (if sensory data is contained in the data set), or created (if non-sensory data such as a presentation slide is contained in the data set). Next, this data is processed in accordance with a selected hash function to create a first hash value. The first hash value is digitally signed to create a first digital signature which is placed in the record of the data set.

In this example, suppose the receiving electronic system is authorized to make format changes to the digital document (e.g., font style, background color, etc.); however, its user is not authorized to make substantive changes to the data of the incoming data set. Upon receiving the incoming data set, the receiving electronic system performs a hash function on the data of the incoming data set to produce an incoming hash value (Blocks 810–815). This hash value is used to verify data integrity at any time during or after post-processing.

After generating the incoming hash value, the receiving electronic system is able to perform one or more post-processing operations on the data of the incoming data set. Each post-processing operation is entered into a MOS field in the current entry, which records the post-processing operations performed after receiving the incoming data set (Block 820). It is required that the design of the manipulation agent enforces a strict policy of indicating all post-processing operations of the data in the created entry.

Upon completing every desired post-processing operation (Block 825), the current entry is completed with information so as to include at least the following: (i) the incoming hash value; (ii) outgoing hash value; (iii) the MOS values associated with the post-processing operations; (iv) the extended digital signature; and (v) optionally MA_TYPE, MP_ID and/or digital certificates (Block 830). After the entry has been completed, the record of the new data set is updated by appending another entry to the existing record (Block 835).

Figure 10:
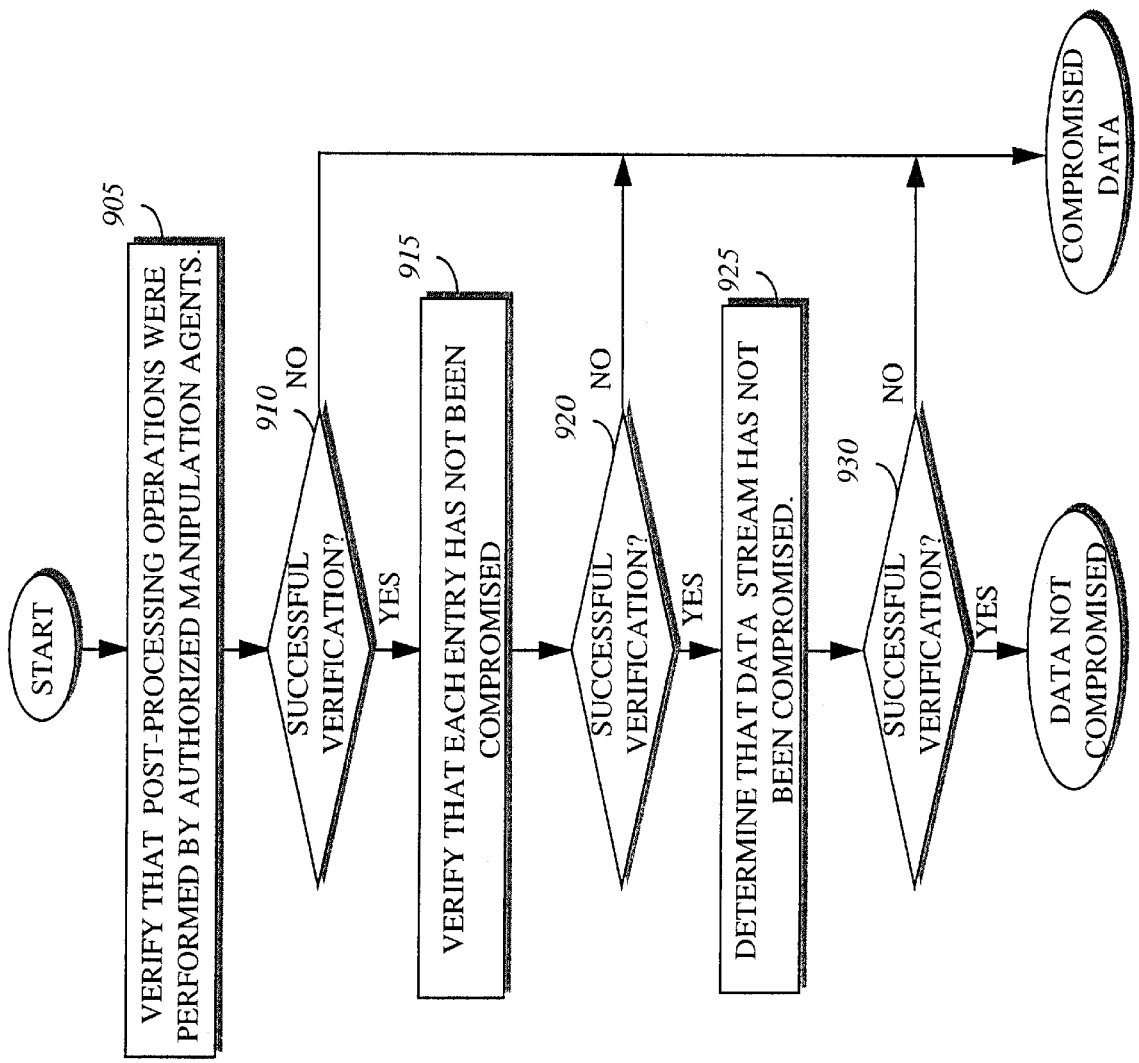
FIG. 10 is a flowchart illustrating an embodiment of a validation scheme.

Referring to FIGS. 10 and 11, an illustrative flowchart of operational steps used to ensure that data produced by an electronic system has not been compromised. The ordering of these operational steps may vary from the embodiment described below. One operational step is to verify that the outstanding post-processing operations are performed by authorized manipulation agent(s) as configured by their manipulation process(es) (Block 905). For example, such verification may be accomplished by analyzing a recorded MA_TYPE and MP_ID against a listing of one or more acceptable MA_TYPEs and MP_IDs found in an external database, internal storage of the electronic system or perhaps a printed publication (Block 910). Alternatively, such verification may be accomplished by providing a digital certificate from a trusted evaluation authority which evaluated whether the MA_TYPE and MP_ID combination(s) associated with a manipulation agent is (are) acceptable.

Another operational step is to verify that each entry has not been compromised (Block 915). This is accomplished by decrypting the extended digital signatures for each entry $745_1$–$745_n$ in order to recover a corresponding hash value associated with each extended digital signature. Each recovered hash value is successively compared with the outgoing hash value contained in that entry. For example, for entry $745_n$, extended digital signature $750_6$ is decrypted to recover a hash value which is compared to outgoing hash $750_5$. If a successful match is determined, the process would continue for each entry of the record. This recovery and comparison process is continued for each remaining entry $745_1$–$745_{n-1}$ in a chronological order, in a reverse chronological order or in another ordering scheme. Otherwise, if the recovery and comparison process uncovers a discrepancy between a recovered hash value and its corresponding hash value, data is considered to be compromised (Block 920).

Finally, it is necessary to verify that the data stream has not been compromised (Block 925). One embodiment used to perform such verification includes hashing the data of the record to produce a new hash value which is compared with outgoing hash value $750_5$ of the most recent entry $745_n$ as shown in FIGS. 10 and 11. If these values compare, the incoming hash value $750_1$ of entry $745_n$ ($n \geq 4$ in this embodiment) is compared with the outgoing hash value $750_5$ of a preceding entry $745_{n-1}$. This continues until incoming and outgoing hash values of successive entries do not compare or the comparison of incoming and outgoing hash values is completed without experiencing a mismatch (Block 930). It is noted that the last verification would likely involve authenticating the digital signature of the provider.

It is contemplated that the second and third operational steps may be performed in combination by eliminating the outgoing hash value entry $750_5$ for each record entry and simply decrypting the extended digital signature for each entry $745_1$–$745_n$ to recover its corresponding outgoing hash value. In general, each recovered outgoing hash value is successively compared with an incoming hash value contained in a subsequent entry (with exception to the most current outgoing hash value). For example, for entry $745_n$, extended digital signature $750_6$ would be decrypted to recover a corresponding outgoing hash value which is compared to hash value of the data portion of the current data set. If a successful match is determined, the process would continue for a preceeding entry of the record.

Next, extended digital signature of entry $745_{n-1}$ would be decrypted to recover its outgoing hash value. This value is compared with the incoming hash value $750_1$ of entry $745_n$. If a successful match is determined, the process would continue for the next preceeding entry of the record. This process would continue for each remaining entry $745_1$–$745_{n-2}$ unless a discrepancy between a recovered outgoing hash value and its immediately subsequent incoming hash value is uncovered. In that case, data is considered to be compromised (Step 920). It is contemplated that this process may be performed in other ordering schemes besides the scheme presented above.

It is contemplated that because the manipulation agent is a trusted hardware platform, the authenticity of each post-processing operation (through its hash value and signature) is ensured. This ensures that the record is correct. Note that this scheme does not require the manipulation agents to authenticate any of the previous operations performed on the data set. If the data set is corrupted at any point, the associated record becomes invalid and the entire data set is considered compromised. Thus, verification is only required once the data set is fully post-processed and ready for use by another entity. It is contemplated, however, that each manipulation agent may be able to check the validity of the preceding extended digital signature(s). As a result, if the signature is validated, the manipulation agent may substitute the entries for a single message that validation of the digital signature concerning certain post-processing operations has been verified. This may be done to reduce the size of the data set to avoid potential bandwidth problems.

While various embodiments of the invention have been described, those skilled in the art will realize that other embodiments of the invention are easily foreseeable without departing from the spirit and scope of the present invention. Moreover, well known circuitry and operational steps are not set forth in detail in order to avoid unnecessarily obscuring the present invention. The invention should, therefore, be measured in terms of the following claims.

What is claimed is:

1. A method comprising:

receiving a data set including a record and data, the data set being digitally signed; and performing at least one lossy post-processing operation on the data to produce a resulting data set, the resulting data set does not exactly match the digitally signed data set; and recording characteristics of each of the at least one lossy post-processing operation into a record of the resulting data set.

2. The method of claim 1, wherein after the recording of the characteristics, the method further comprising:

placing a first hash value of the data into the record.

3. The method of claim 2, wherein after the recording of the characteristics, the method further comprising:

placing a second hash value of the data into the record.

4. The method of claim 3 further comprising:

placing an extended digital signature into the record of the resulting data set.

5. The method of claim 4 further comprising:

placing a manipulation operation specifier corresponding to each lossy post-processing operation into the record, the manipulation operation specifier indicating the at least one lossy post-processing operation performed on the data after the digitally signed data set was digitally signed.

6. The method of claim 5 further comprising:

placing a manipulation agent type into the record of the resulting data set, the manipulation agent type establishing which manipulation agent performed the at least one lossy post-processing operation.

7. The method of claim 6 further comprising:

placing a manipulation process identifier into the record of the resulting data set, the manipulation process identifier indicating a specific configuration of a manipulation agent used to perform the at least one lossy post-processing operation.

8. The method of claim 7 further comprising:

placing at least one digital certificate in the record, the digital certificate includes a public key of the manipulation agent.

9. A method comprising:

(a) receiving an electronically signed data set including data and a record;

(b) placing a first hash value of the data into the record after receiving the data set; and (c) placing a second hash value of the data into the record after performing at least one lossy post-processing operation on the data.

10. The method of claim 9 further comprising:

(d) placing a manipulation process identifier into the record of the data set, the manipulation process identifier to indicate a specific configuration of a manipulation agent used to perform the at least one lossy post-processing operation.

11. The method of claim 9 further comprising:

(d) placing an extended digital signature into the record of the data set.

12. The method of claim 11, wherein the placing of the extended digital signature into the record includes:

(d1) performing a hash operation on the data to produce a result after all of the at least one lossy post-processing operation have completed; and (d2) encrypting the result in accordance with a public key cryptographic function.

13. The method of claim 9 further comprising:

(d) placing a manipulation agent type into the record of the data set, the manipulation agent type establishing which manipulation agent performed the at least one lossy post-processing operation.

14. The method of claim 9, wherein before placing the second hash value of the data into the record, the method further comprising:

(b1) placing a manipulation operation specifier corresponding to the at least one lossy post-processing operation into the record of the data set, the manipulation operational specifier indicating the at least one lossy post-processing operation.

15. The method of claim 9 further comprising:

(d) placing at least one digital certificate into the record of the data set, the digital certificate includes a public key.

16. A system comprising:

a bus; and a first manipulation agent connected to the bus, the first manipulation agent including an internal bus, a memory element connected to the internal bus, and a processor coupled to the internal bus, the processor to receive an electronically signed data set, to perform at least one lossy post-processing operation on data of the data set and to generate an extended digital signature for storage into a record of the data set.

17. The system of claim 16 further comprising:

a second manipulation agent in communication with the first manipulation agent, the second manipulation agent capable of performing at least one lossy post-processing operation on the data after the at least one lossy post-processing operation and generating an extended digital signature for storage into the record of the data set.

18. The system of claim 16, wherein the bus is one of a Peripheral Component Interconnect (PCI) bus, a host bus and an Advanced Graphics Port (AGP) bus.

19. The system of claim 16, wherein the bus is a dedicated bus solely for use by the first manipulation agent.

20. The system of claim 16 further comprising:

a host processor connected to the first manipulation agent via the bus.

21. The system of claim 20, wherein the bus includes a backside bus.

22. A system comprising:

a processor substrate;

a bus integrated in the processor substrate;

a host processor coupled to the bus; and a manipulation agent placed on the processor substrate and connected to the bus, the manipulation agent including an internal bus, a memory element coupled to the internal bus, and a processor coupled to the internal bus, the processor to receive an electronically signed data set, to perform at least one lossy post-processing operation on data of the data set and to generate an extended digital signature for storage into a record of the data set; and a cartridge substantially enclosing the processor substrate.

23. A system protecting integrity of a data set including data and a record, the system comprising:

a bus; and a host processor connected to the bus, the host processor (i) to receive an electronically signed data set, (ii) to perform at least one lossy post-processing operation on data of the data set, (iii) to record characteristics of the at least one lossy post-processing operation on the data within a record of the data set, the lossy post-processing operation being associated with an operation on the data of the data set, and (iv) to place an extended digital signature into the record.

24. The system according to claim 23, wherein the at least one lossy post-processing operation includes at least one cropping, feature enhancement, recolorization, compression, decompression, resolution reduction, interpolative resolution enhancement and rotation.

* * * * *